(12) United States Patent
Urabe et al.

(10) Patent No.: US 12,190,555 B2
(45) Date of Patent: Jan. 7, 2025

(54) INFORMATION PROCESSING DEVICE, RANGE DETERMINATION METHOD, AND PROGRAM

(71) Applicant: OMRON Corporation, Kyoto (JP)

(72) Inventors: Kazuya Urabe, Kyoto (JP); Kiyoaki Tanaka, Kyoto (JP); Kazunori Kitazumi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 342 days.

(21) Appl. No.: 17/778,324

(22) PCT Filed: Nov. 18, 2020

(86) PCT No.: PCT/JP2020/043026
§ 371 (c)(1),
(2) Date: May 19, 2022

(87) PCT Pub. No.: WO2021/117444
PCT Pub. Date: Jun. 17, 2021

(65) Prior Publication Data
US 2023/0033125 A1    Feb. 2, 2023

(30) Foreign Application Priority Data
Dec. 11, 2019 (JP) ................. 2019-223712

(51) Int. Cl.
*G06V 10/25*    (2022.01)
*G06T 7/13*    (2017.01)
(Continued)

(52) U.S. Cl.
CPC ............ *G06V 10/25* (2022.01); *G06T 7/13* (2017.01); *G06T 11/203* (2013.01); *G06T 11/60* (2013.01);
(Continued)

(58) Field of Classification Search
CPC ........ G06V 10/25; G06V 10/751; G06T 7/13; G06T 11/203; G06T 11/60;
(Continued)

(56) References Cited

U.S. PATENT DOCUMENTS 8,558,892 B2 * 10/2013 Brodsky .......... G08B 13/19652
348/155
2002/0057908 A1   5/2002 Otani
(Continued)

FOREIGN PATENT DOCUMENTS

| CN | 108141532 A | 6/2018 |
| CN | 108141538 A | 6/2018 |

(Continued)

OTHER PUBLICATIONS

International Search Report issued in Intl. Appln. No. PCT/JP2020/043026 mailed Feb. 16, 2021. English translation provided.
(Continued)

*Primary Examiner* — Neil R McLean
(74) *Attorney, Agent, or Firm* — ROSSI, KIMMS & McDOWELL LLP

(57) ABSTRACT

An information processing device that determines a monitoring target range of a predetermined place includes an acquisition unit configured to acquire information on a line drawn by a user with respect to image data in which the predetermined place is imaged, and a determination unit configured to determine a range indicated by an area on the line as the monitoring target range, a thickness of the line being increased.

13 Claims, 8 Drawing Sheets

(51) Int. Cl.
  *G06T 11/20* (2006.01)
  *G06T 11/60* (2006.01)
  *G06V 10/75* (2022.01)

(52) U.S. Cl.
  CPC .. *G06V 10/751* (2022.01); *G06T 2207/10028* (2013.01); *G06T 2207/20104* (2013.01)

(58) Field of Classification Search
  CPC ........... G06T 2207/10028; G06T 2207/20104; H04N 7/18
  USPC ....................................................... 382/103
  See application file for complete search history.

(56) References Cited

U.S. PATENT DOCUMENTS

| | | |
|---|---|---|
| 2014/0355828 A1 | 12/2014 | Kusumoto |
| 2016/0116823 A1 | 4/2016 | Okura et al. |
| 2018/0144206 A1 | 5/2018 | Kusumoto |
| 2018/0288316 A1 | 10/2018 | Shionoya et al. |
| 2018/0302552 A1 | 10/2018 | Shionoya et al. |
| 2020/0228705 A1 | 7/2020 | Shionoya et al. |
| 2021/0225009 A1* | 7/2021 | Saito ..................... G06V 40/23 |
| 2021/0321031 A1 | 10/2021 | Shionoya et al. |
| 2023/0283910 A1 | 9/2023 | Shionoya et al. |
| 2024/0214689 A1 | 6/2024 | Shionoya et al. |

FOREIGN PATENT DOCUMENTS

| | | | |
|---|---|---|---|
| CN | 109194945 A | | 1/2019 |
| JP | 2001014480 A | | 1/2001 |
| JP | 2009273006 A | | 11/2009 |
| JP | 2014236312 A | | 12/2014 |
| JP | 2015039125 A | | 2/2015 |
| JP | 2016081001 A | | 5/2016 |
| JP | 2018077637 A | * | 5/2018 |
| WO | 2019230877 A1 | | 12/2019 |

OTHER PUBLICATIONS

Written Opinion issued in Intl. Appln. No. PCT/JP2020/043026 mailed Feb. 16, 2021. English translation provided.
Office Action issued in Chinese Appln. No. 202080083460.9, mailed Sep. 14, 2024. English translation provided.
ZHANG. "The design and implementation of "Skynet" video monitoring system in Ganzhou Telecom", 2017. China Master's Theses Full-text Database, Feb. 15, 2019 (Feb. 15, 2019), Full Text. Cited in NPL1. English abstract provided.

* cited by examiner

INFORMATION PROCESSING DEVICE, RANGE DETERMINATION METHOD, AND PROGRAM

TECHNICAL FIELD

The present invention relates to an information processing device, a range determination method, and a program.

BACKGROUND ART

Conventionally, movement of a person or object is monitored (sensed; inspected) by a fixed point camera such as a monitoring camera installed in an office or a factory. In such monitoring, limiting a monitoring target to a range in which a person or object may move allows for reducing the effort and time of sensing. However, for example, the range in which a person or object may move is likely to change frequently due to a layout change or a facility change in a factory. Thus, precisely designating the monitoring range by user's input is troublesome and undesirable.

Meanwhile, Patent Document 1 describes a technique of, when a user selects one pixel on image data, detecting pixels having a color similar to that of the one pixel in the image data, and setting a range defined by the detected pixels as a target range.

PRIOR ART DOCUMENT

Patent Document

Patent Document 1: Japanese Unexamined Patent Publication No. 2001-14480

SUMMARY OF THE INVENTION

Problems to be Solved by the Invention

However, in the technique described in Patent Literature 1, for example, in a case where a color of an aisle portion through which a person moves is similar to a color of a cardboard or a desk away from the aisle, a range including the cardboard or the desk is also designated as the monitoring target range. For this reason, an extra area is also likely to be set as the monitoring target range.

Thus, an object of the present invention is to provide a technique capable of achieving both reduction in user's labor and determination of an appropriate monitoring target range.

Means for Solving the Problem

In order to achieve the above object, the present invention adopts the following configuration.

A first aspect of the present invention is an information processing device that determines a monitoring target range of a predetermined place, the information processing device including an acquisition unit configured to acquire information on a line drawn by a user with respect to image data in which the predetermined place is imaged, and a determination unit configured to determine a range indicated by an area on the line as the monitoring target range, a thickness of the line being increased. Note that the predetermined place may be any place in a factory, an office, or the like. The monitoring target range is a range through which a person or object is assumed to move.

According to such a configuration, the user is only required to draw a line with respect to image data, and thus it is easy to determine the monitoring target range. In addition, since the range indicated by the area on the line having the increased thickness is determined as the monitoring target range, a range indicated by an area away from the line is not set as the monitoring target. Thus, an appropriate range can be determined as the monitoring target. Therefore, it is possible to reduce the possibility of erroneously detecting movement of a person or object within the range where no person or object is likely to move, when monitoring the predetermined place.

The determination unit may be configured to determine a range indicated by an area on the line as the monitoring target range, a thickness of the line being increased by a given predetermined length. According to such a configuration, the line thickness can be increased by a uniform length. Thus, for example, when the user inputs a width of an aisle or the like to be monitored in advance, an appropriate range can be set as the monitoring target. In addition, since the increased amount of the line thickness is unified, it is possible to reduce processing load on the information processing device for determining the monitoring target range.

The determination unit may be configured to determine a range indicated by an area on the line as the monitoring target range, thicknesses of the line at locations of points of the line being increased until the line reaches a boundary location included in the image data. Here, the boundary location is a boundary between areas or objects. A person or object to be monitored may move to the boundary location. Therefore, according to such a configuration, the monitoring target range can be appropriately determined even when an amount of the line thickness to increase is unknown.

The determination unit may be configured to calculate thicknesses of the line at locations of points of the line in a case where the thicknesses of the line at the locations of the points of the line are increased until the line reaches a boundary location included in the image data, and determine a range indicated by an area on the line as the monitoring target range, a thickness of the line being increased by a length of a representative value of thicknesses calculated at locations of a plurality of points among the points of the line. Here, the representative value is an average value, a minimum value, a maximum value, a median value, a mode value, or the like. According to such a configuration, the increased amount of the line thickness can be determined according to a result of increasing the line thicknesses until the line reaches the boundary location. Thus, the monitoring target range can be determined with higher accuracy. In addition, even in a case where the image data includes noise, influence of the noise can be suppressed by unifying the increased amount of the line thickness according to the representative value. Thus, the monitoring target range can be appropriately determined.

The plurality of points may be points corresponding to pixels having a pixel value among the points of the line, a difference between the pixel value and a set pixel value being smaller than a predetermined threshold. The set pixel value may be a pixel value that most pixels have among pixels corresponding to the points of the line. For example, an installation object may be arranged above a position to be included in the area of the monitoring target. This results in the possibility that pixels for representing the installation object is used for the plurality of points for increasing the line thickness, and the increased amount of the line thickness is inappropriately determined. However, according to such a configuration, such a possibility can be reduced. That is, the monitoring target range can be determined more appropriately.

The determination unit may be configured to determine the representative value for each of a plurality of second lines obtained by dividing the line, and determine a range indicated by an area on the plurality of second lines as the monitoring target range, thicknesses of the plurality of second lines being increased by a length of the representative value for each of the plurality of second lines. According to such a configuration, even in a case where a width of a range to be set as the monitoring target range varies from place to place, the increased amount of the line thickness can be determined for each place. Thus, the monitoring target range can be determined more appropriately.

The boundary location may be a location of an edge pixel in the image data. The boundary location may be a location of a pixel in the image data, a pixel value of the pixel differing from a pixel value of pixels at the locations of the points of the line by more than a first threshold. The image data may include height information of positions of the predetermined place, and the boundary location may be a location in the image data, a height at the location differing from a height at the locations of the points of the line by more than a second threshold. Note that the boundary location is not limited to the above-described locations, and may be any location as long as it can be determined as a boundary between areas or objects.

The information processing device may further include a display unit configured to display an image based on the image data, and an accepting unit configured to accept a user input for drawing the line with respect to the image data. In addition, the information processing device may further include an imaging unit configured to acquire the image data by imaging.

A second aspect of the present invention is a range determination method of determining a monitoring target range of a predetermined place, the range determination method including steps of acquiring information on a line drawn by a user with respect to image data in which the predetermined place is imaged, and determining a range indicated by an area on the line as the monitoring target range, a thickness of the line being increased.

The present invention may be regarded as a control device including at least a part of the above units, or may be regarded as a monitoring control device or a monitoring control system. Moreover, the present invention may be regarded as a monitoring control method including at least a part of the above processes or a control method of the information processing device. Furthermore, the present invention can also be regarded as a program for realizing such a method or a recording medium in which such a program is permanently recorded. Note that each of the units and the processes can be combined with each other as much as possible to constitute the present invention.

Effect of the Invention

According to the present invention, it is possible to provide a technique of achieving both reduction in user's labor and determination of an appropriate monitoring target range.

MODE FOR CARRYING OUT THE INVENTION

Hereinafter, embodiments for carrying out the present invention will be described with reference to the drawings. However, the interpretation of the claims is not limited only to the matters described in the embodiments. The interpretation of the claims also includes a scope described so that a person skilled in the art can understand that the object of the invention can be achieved in consideration of the common general technical knowledge at the time of filing.

First Embodiment

[Configuration of Information Processing System]

Figure 1:
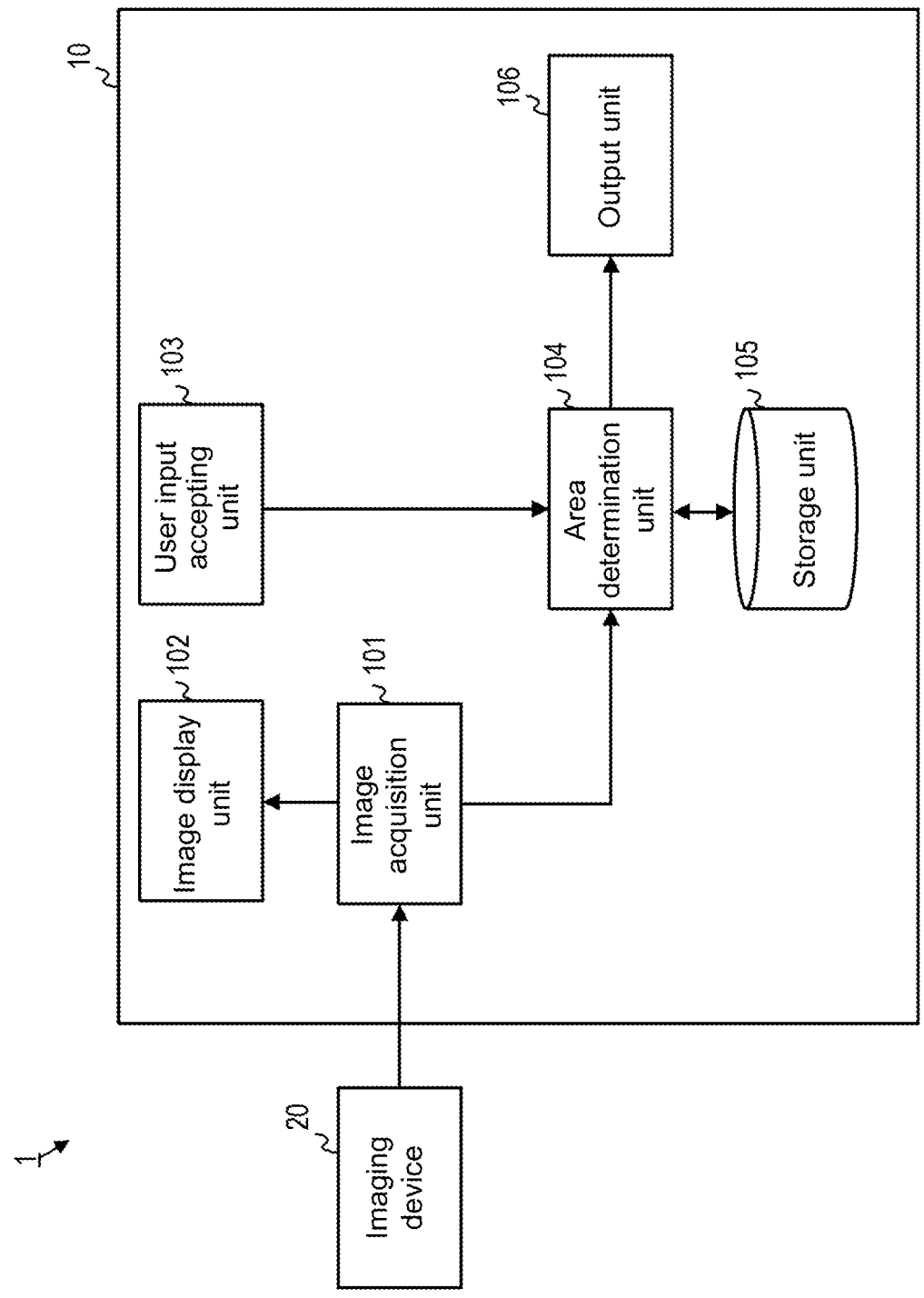
FIG. 1 is a configuration diagram of an information processing system according to a first embodiment.

Hereinafter, an information processing system 1 that determines a monitoring target range according to a first embodiment will be described. FIG. 1 is a diagram illustrating a configuration of the information processing system 1. The information processing system 1 includes an information processing device 10 and an imaging device 20.

The information processing device 10 is an information processing terminal such as a PC or a server that determines the monitoring target range from image data captured by the imaging device 20.

Figure 2A:
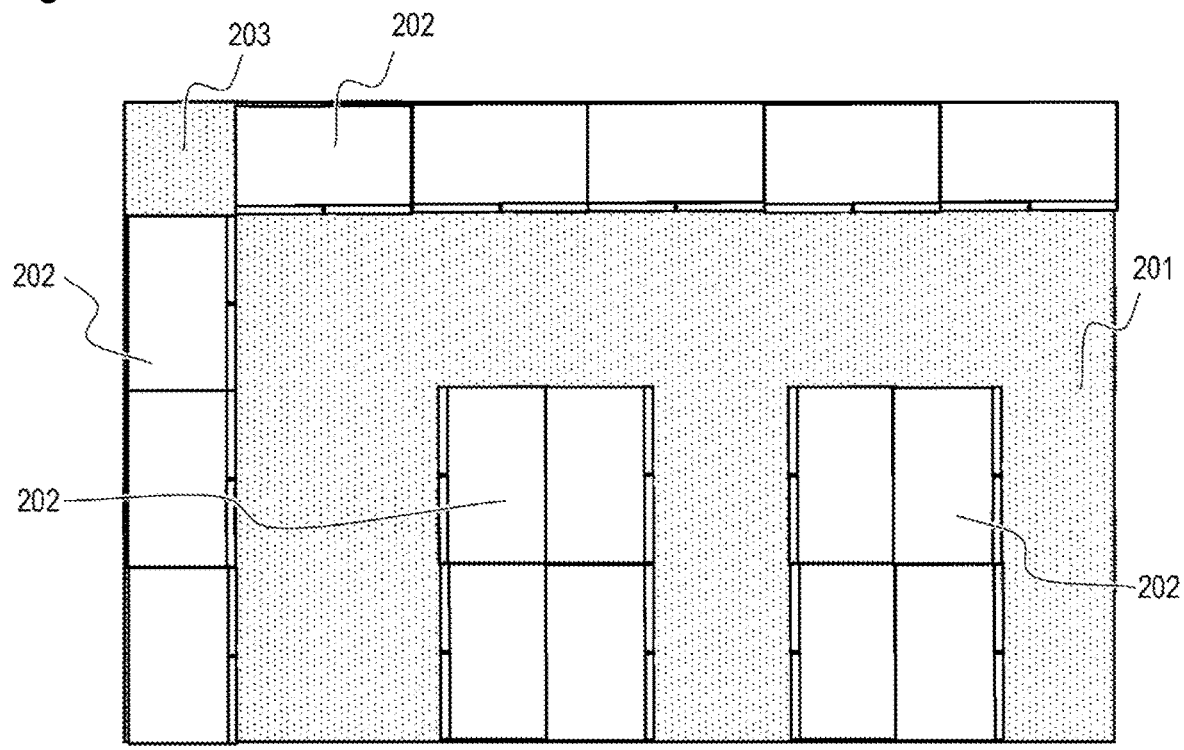
FIGS. 2A and 2B are diagrams for explaining a predetermined place according to the first embodiment.
Figure 2B:
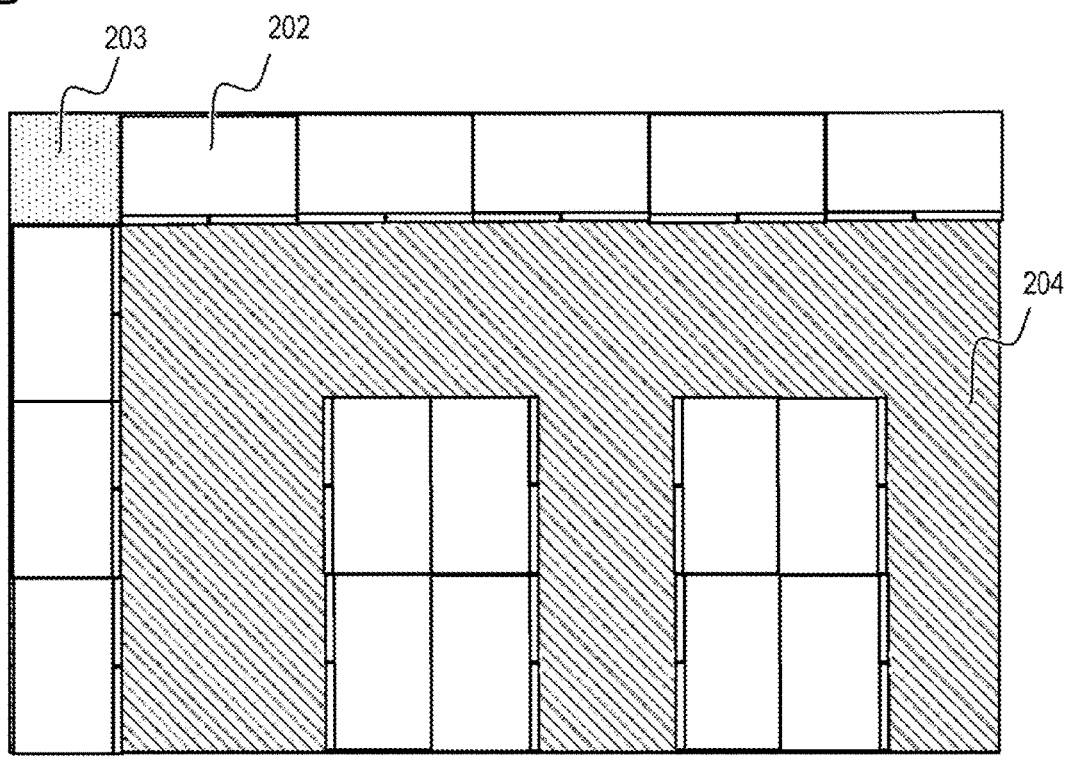

The imaging device 20 images a predetermined place in a factory or an office to acquire image data (two-dimensional image data). For example, as illustrated in FIG. 2A, the imaging device 20 acquires image data by imaging an office including an aisle 201, shelves 202, and a floor 203. Here, the aisle 201 is considered to correspond to a range in which a person or object moves. Thus, as illustrated in FIG. 2B, it is desirable to determine a range indicated by an area 204 matching the aisle 201 as the monitoring target range. Note that the imaging device 20 is, for example, a fixed point camera that is fixed to a ceiling of the office or the like and can constantly image the predetermined place in a certain range from a certain place. Thus, the imaging device 20 can also monitor the monitoring target range determined by the information processing device 10 from the certain place.

Note that the image data captured by the imaging device 20 may be either monochrome or color. Furthermore, a fisheye camera may be used as the imaging device 20. Using the fisheye camera as the imaging device 20 allows for acquiring image data with a wide field of view at an ultra-wide angle, so that a wider range can be monitored. The imaging device 20 transmits the captured image data to the information processing device 10.

(Configuration of Information Processing Device)

Next, an internal configuration of the information processing device 10 will be described with reference to FIG. 1. The information processing device 10 includes an image acquisition unit 101, an image display unit 102, a user input accepting unit 103, an area determination unit 104, a storage unit 105, and an output unit 106.

The image acquisition unit 101 acquires, from the imaging device 20, image data of a predetermined place inside an office, a factory, or the like for determining the monitoring target range. Note that the image acquisition unit 101 and the imaging device 20 may communicate with each other in a wired or wireless manner by any communication method.

The image display unit 102 acquires the image data from the image acquisition unit 101 and displays an image based on the image data. Thus, the image display unit 102 displays, for example, an image showing the inside of the office as illustrated in FIG. 2A. The image display unit 102 displays the image on a display such as a liquid crystal display (LCD) or an organic EL.

Figure 3A:
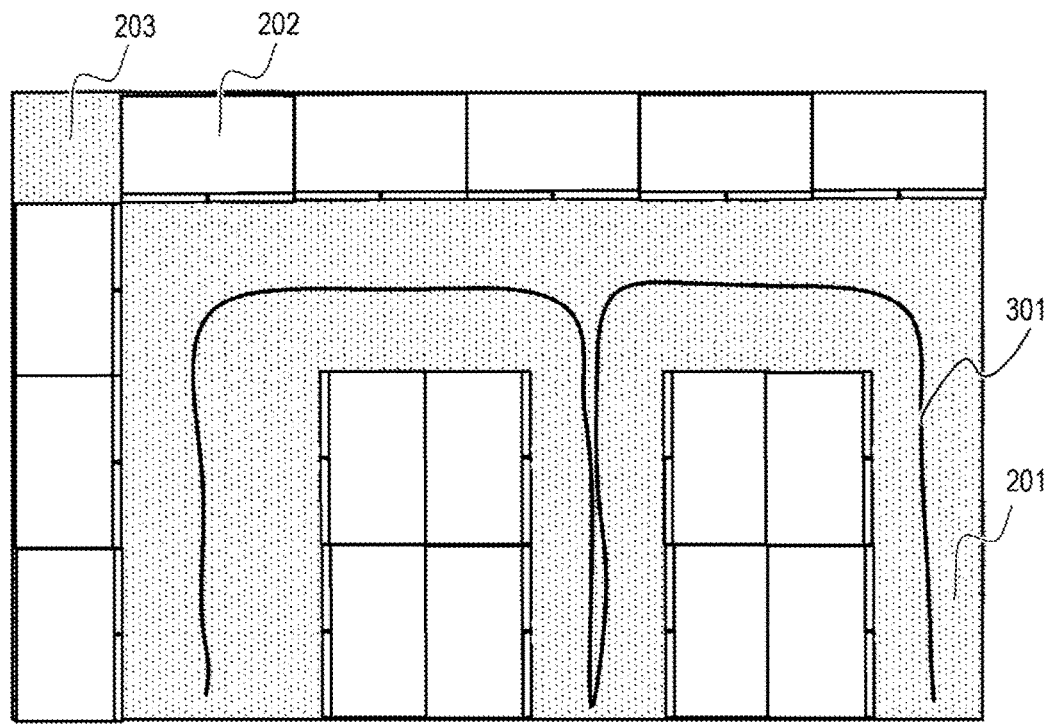
FIG. 3A is a diagram illustrating a line designated by a user according to the first embodiment.

The user input accepting unit 103 (acquisition unit) accepts (acquires) a user input for designating (drawing) a line for determining the monitoring target range with respect to the image (image data) showing the predetermined place displayed by the image display unit 102. As will be described in detail later, a range indicated by an area on the line designated by the user having an increased thickness is determined as the monitoring target range. Thus, the user designates the line in consideration of this. For example, when the image of the office as illustrated in FIG. 2A is displayed, in order to set the aisle 201 where a person moves as the monitoring target, there may be provided a user input as illustrated in FIG. 3A for designating a line 301 along the aisle 201. Here, the user input accepting unit 103 includes a pointing device such as a touch panel or a mouse used by the user to designated the line.

The area determination unit 104 acquires information on the line designated (drawn) by the user from the user input accepting unit 103, and acquires the image data from the image acquisition unit 101. In addition, the area determination unit 104 determines the monitoring target range of the predetermined place from the line information and the image data. Thus, it may be said that the area determination unit 104 includes an information acquisition unit that acquires the line information and the image data, and a determination unit that determines the monitoring target range.

The storage unit 105 stores information used by the area determination unit 104 to determine the monitoring target range. In addition, the storage unit 105 may also store the information on the line designated by the user and the image data, as well as the monitoring target range of the predetermined place. Furthermore, the storage unit 105 may store a program for operating the functional units. Note that the storage unit 105 can include a plurality of storage members such as a read-only memory (ROM) that stores a program important as a system, a random access memory (RAM) that enables high-speed access, and a hard disk drive (HDD) that stores large-volume data.

The output unit 106 outputs information indicating the monitoring target range determined by the area determination unit 104. The output unit 106 may output the information to the imaging device 20 in a case where the imaging device 20 performs monitoring, or may output the information to an external display device. Furthermore, for example, the output unit 106 may output the information indicating the monitoring target range to a printer so that the user can check by paper.

The information processing device 10 and the imaging device 20 can be configured by, for example, a computer including a CPU (processor), a memory, a storage, and the like. In this case, the program stored in the storage is loaded into the memory and is executed by the CPU to realize the configuration illustrated in FIG. 1. Such a computer may be a general-purpose computer such as a personal computer, a server computer, a tablet terminal, or a smartphone, or may be an embedded computer such as an on-board computer. Alternatively, all or a part of the configuration illustrated in FIG. 1 may be configured by an ASIC, an FPGA, or the like. Alternatively, all or a part of the configuration illustrated in FIG. 1 may be realized by cloud computing or distributed computing.

[Monitoring Range Determination Processing]

Figure 4:
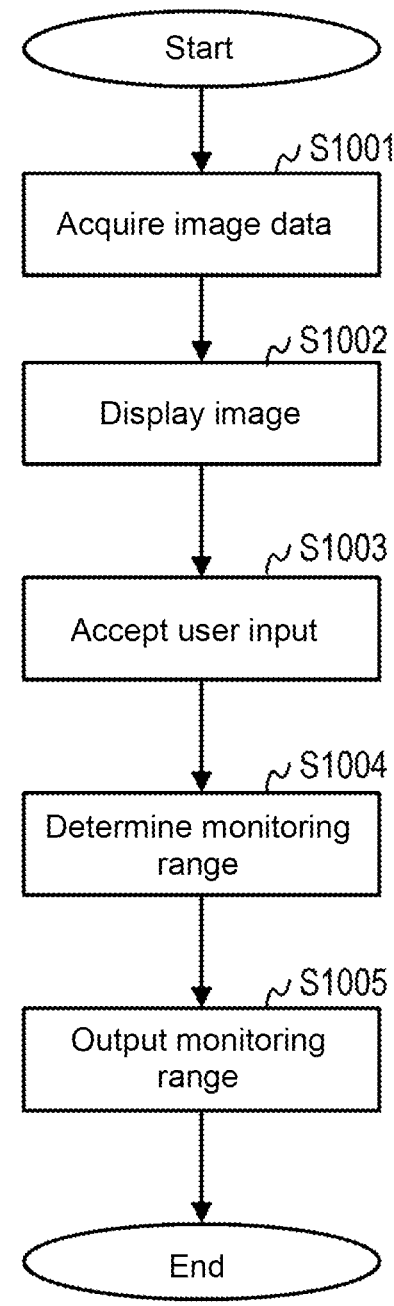
FIG. 4 is a flowchart illustrating monitoring range determination processing according to the first embodiment.

Hereinafter, processing for determining the monitoring target range (range determination method) that is executed by the information processing device 10 will be described with reference to a flowchart illustrated in FIG. 4. It is assumed that the imaging device 20 captures the image data of the office illustrated in FIG. 2A for determining the monitoring target range before the processing of this flowchart starts. Note that processes in this flowchart are executed by the functional units of the information processing device 10 on the basis of the program stored in the storage unit 105.

In step S1001, the image acquisition unit 101 acquires the captured image data from the imaging device 20. The image acquisition unit 101 outputs the acquired image data to the image display unit 102 and the area determination unit 104. The image acquisition unit 101 may further store the acquired image data in the storage unit 105. At this time, the image data acquired by the image acquisition unit 101 may be still image data or moving image data. In a case where the image acquisition unit 101 acquires moving image data, one frame of the moving image data may be output to the image display unit 102 and the area determination unit 104 so that the user can easily designate a line in step S1003.

In step S1002, the image display unit 102 displays an image based on the image data. As a result, the image of the office as illustrated in FIG. 2A is displayed. Displaying the image in this manner allows the user to grasp a range in which a person moves in the office from the image.

In step S1003, the user input accepting unit 103 accepts (acquires) a user input for designating a line for determining the monitoring target range with respect to the displayed image. Thus, the user input accepting unit 103 accepts designation of the line 301 via the mouse or the touch panel as illustrated in FIG. 3A. The user input accepting unit 103 outputs information on the accepted line to the area determination unit 104. In addition, the user input accepting unit 103 may store the line information in the storage unit 105.

Figure 5A:
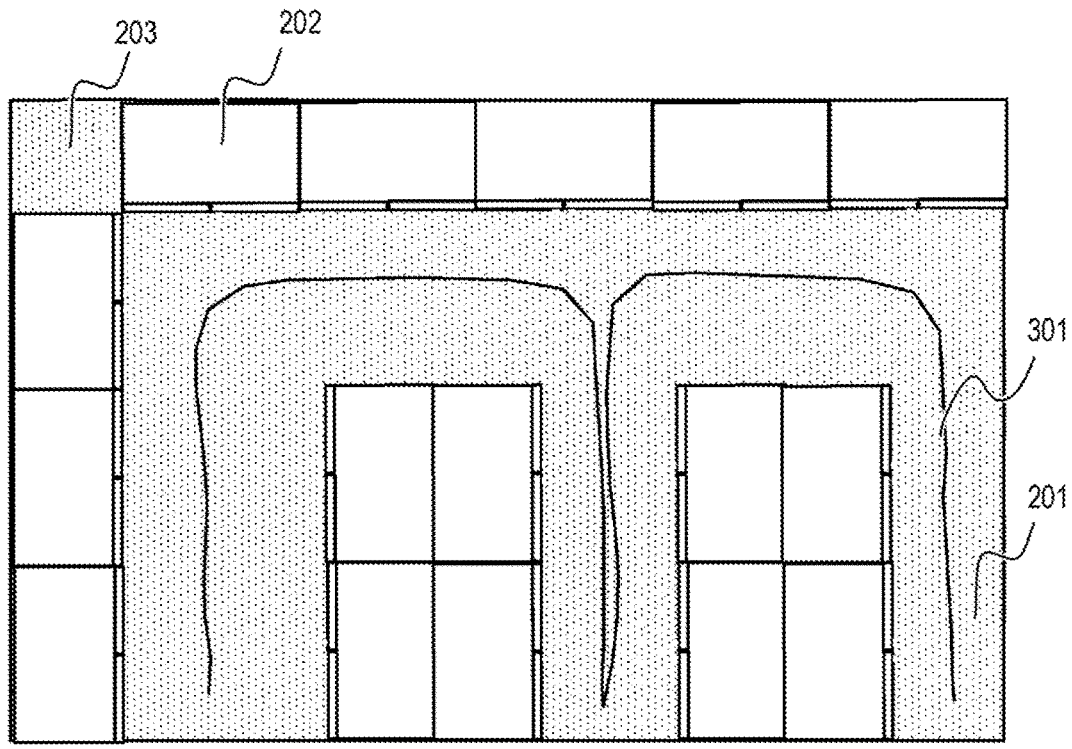
FIG. 5A is a diagram illustrating a line designated by a user according to the first embodiment.

Note that the line designated by the user does not need to be a free curve as illustrated in FIG. 3A, and may be a line formed by straight lines connecting adjacent points among a plurality of points designated by the user as illustrated in FIG. 5A.

Figure 3B:
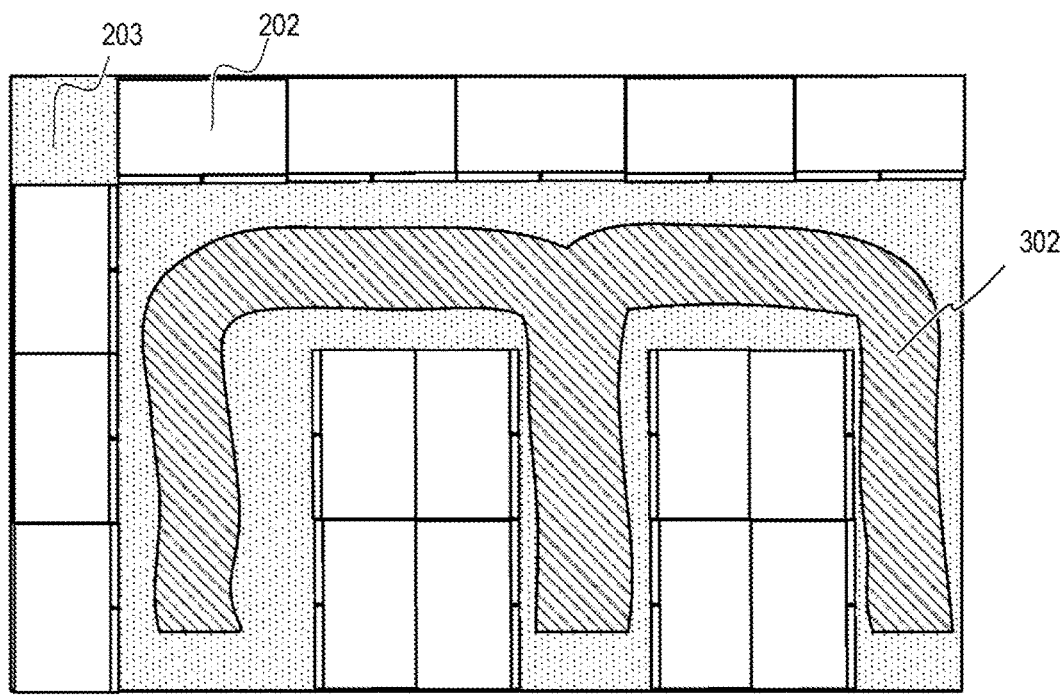
FIG. 3B is a diagram illustrating an area corresponding to a monitoring target range according to the first embodiment.

In step S1004, the area determination unit 104 acquires the image data and the line information, and determines the monitoring target range on the basis of the image data and the line information. In the first embodiment, as illustrated in FIG. 3B, the area determination unit 104 determines a range indicated by an area 302 on the line designated by the user as the monitoring target range, a thickness of the line being increased by a predetermined length. Note that, in the first embodiment, the area determination unit 104 increases the thickness of the line designated by the user by the predetermined length in a normal direction (perpendicular direction) at points of the line, and determines the range indicated by the area 302 on the line having the increased thickness as the monitoring target range. Here, the predetermined length may be input by the user via the user input accepting unit 103, or may be stored in the storage unit 105 in advance. Note that one pixel can be assumed as one unit of the predetermined length that is a length in the image data. The area determination unit 104 outputs information on the determined monitoring target range to the output unit 106. The area determination unit 104 may store the information on the monitoring target range in the storage unit 105.

Here, an example of a method of increasing the thickness of the line designated by the user will be described. First, the area determination unit 104 extracts a plurality of points at predetermined intervals in the line on the basis of the line information. Next, the area determination unit 104 connects adjacent points in the plurality of points by straight lines to generate a line 301 as illustrated in FIG. 5A. Here, the predetermined interval may be any length. However, the shorter the predetermined interval, the more accurately the thickness of the line designated by the user can be increased. Note that such a process is unnecessary in a case where the line designated by the user itself is a line formed by straight lines connecting adjacent points among a plurality of points. Then, the area determination unit 104 increases a thickness of each straight line of the line 301 by the predetermined length in a direction perpendicular to the straight line. As a result, the area determination unit 104 can determine the area on the line designated by the user, the thickness of the line being increased.

Figure 6:
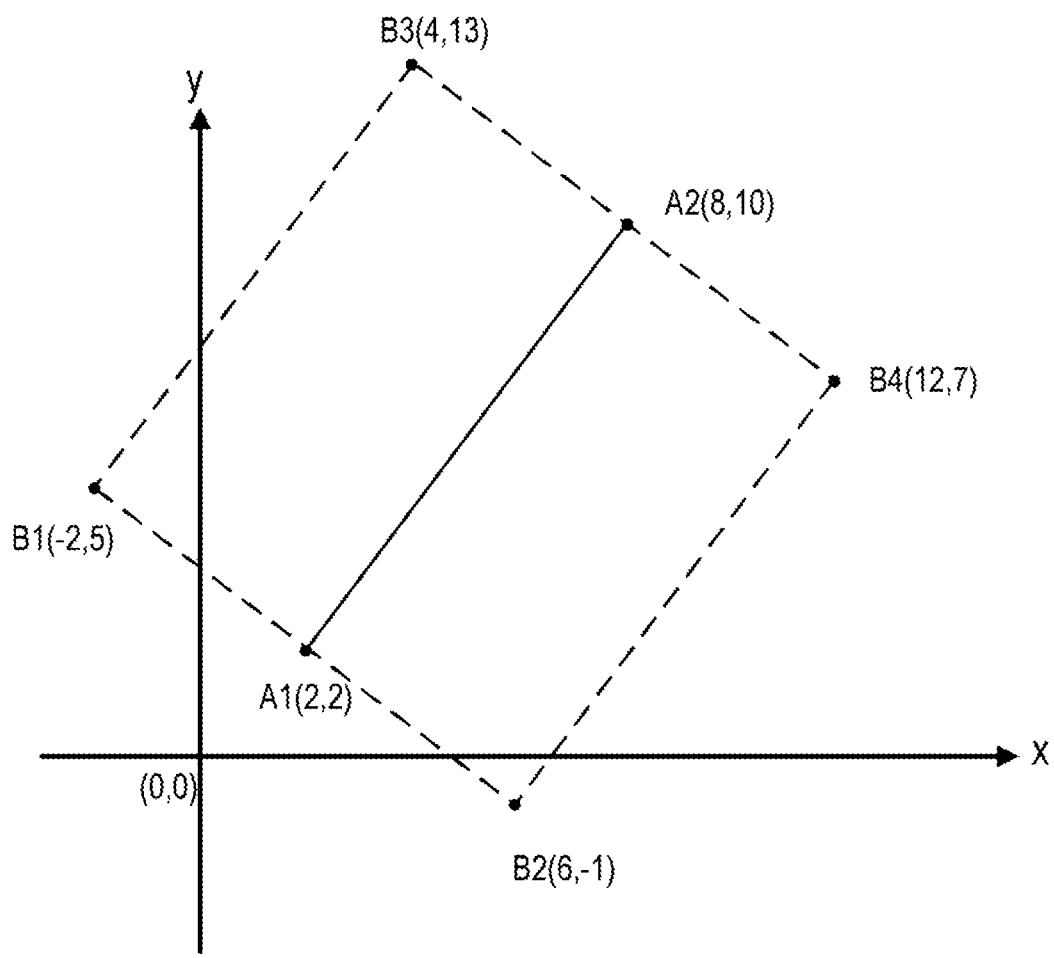
FIG. 6 is a diagram for explaining a process of increasing a line thickness according to the first embodiment.

For example, as illustrated in FIG. 6, there will be described a case of increasing a thickness of a straight line connecting two adjacent points A1($x1$, y1)=(2, 2) and A2($x2$, y2)=(8, 10) among the plurality of points by the predetermined length L1=10. Here, the point (0, 0) is a center position of the image indicated by the image data. At this time, the area determination unit 104 increases the thickness of the straight line by a length=5 that is one half of the predetermined length L1 in two directions perpendicular to the straight line. Then, the area determination unit 104 determines an area including the line having the increased thickness as a part of the area indicating the monitoring target range. That is, a range indicated by the rectangle represented by the broken line formed by connecting the four points B1(−2, 5), B2(6, −1), B3(4, 13), and B4(12, 7) is determined as a part of the monitoring target range. The area determination unit 104 can determine the monitoring target range by executing this series of processes as many times as the number of the straight lines formed by connecting adjacent points.

Figure 7A:
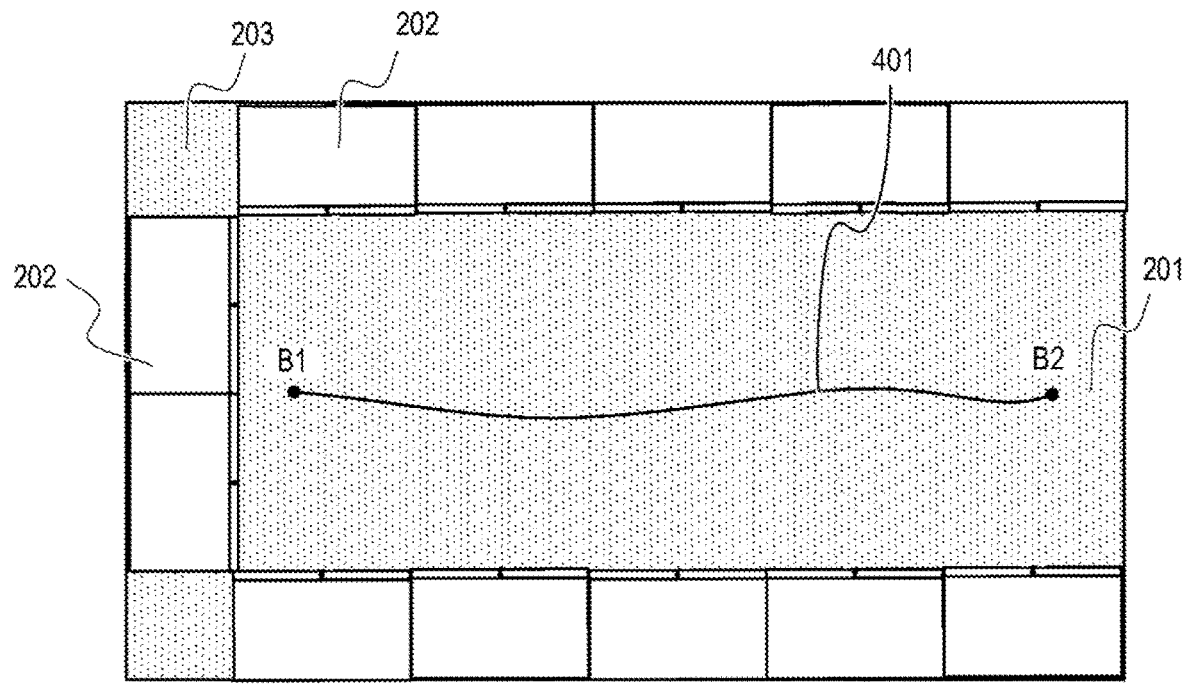
FIG. 7A is a diagram illustrating a line designated by a user according to the first embodiment.
Figure 7B:
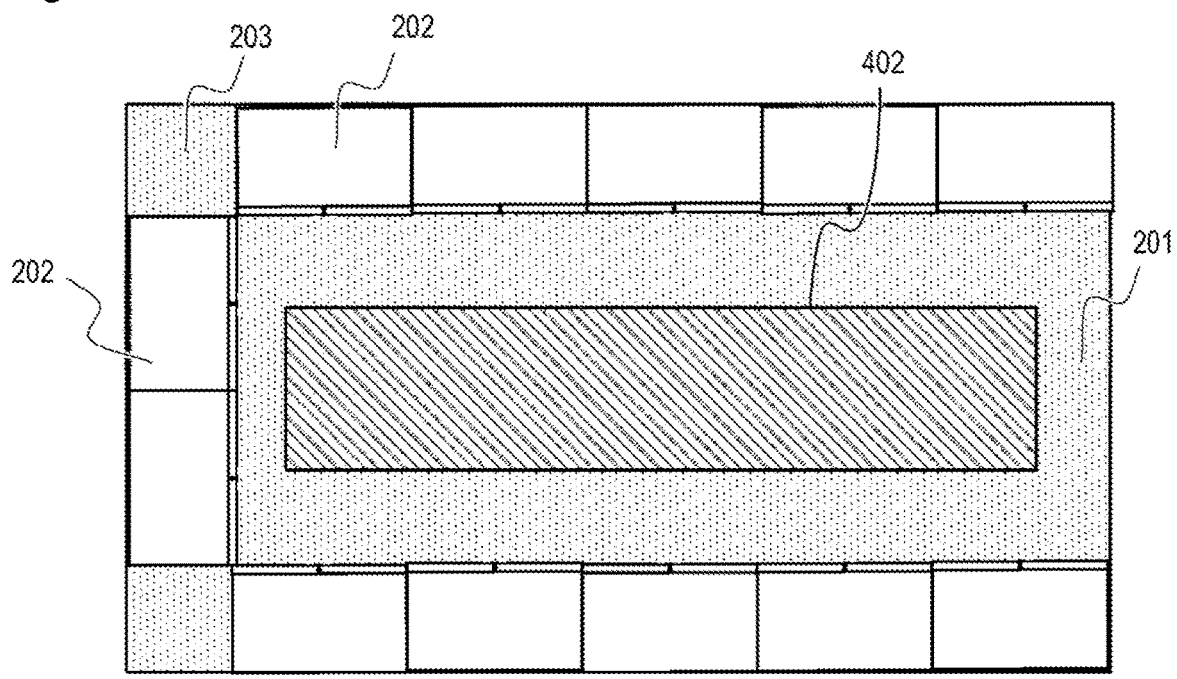
FIG. 7B is a diagram illustrating an area corresponding to a monitoring target range according to the first embodiment.

Another method of increasing the thickness of the line designated by the user is a method of increasing a thickness of a straight line connecting a start point and an end point of the line (two points at the ends of the line) designated by the user in a direction perpendicular to the straight line. Specifically, when a line 401 as illustrated in FIG. 7A is designated by the user, the area determination unit 104 determines a straight line B1B2 connecting two points B1 and B2 at the ends of the line 401. Then, the area determination unit 104 increases the thickness of the straight line B1B2 by the predetermined length in a direction perpendicular to the straight line B1B2. As a result, as illustrated in FIG. 7B, the area determination unit 104 can determine an area 402 on the line designated by the user, the thickness of the line being increased. Using such a method allows for determining the monitoring target range in fewer steps when the user designates a line almost linearly.

Furthermore, the area determination unit 104 may approximate the line designated by the user by an nth-order equation f(x) (n is a natural number) by a known method such as a least squares method, and use the nth-order equation to increase the thickness of the line designated by the user at points of the line. Specifically, there will be described a case of increasing the thickness of the line indicated by the nth-order equation f(x) at a point (x1, f(x1)) of the line. Here, using f'(x) obtained by differentiating f (x) with respect to x, the inclination of the normal line at the point (x1, f(x1)) can be expressed as −1/f' (x1). Thus, the area determination unit 104 may increase the thickness at the point (x1, f(x1)) by the predetermined length in a direction indicated by the inclination (extending direction of the normal line). Performing such a process at each point of the line designated by the user allows for increasing the thickness of the line.

In step S1005, the output unit 106 outputs the information on the monitoring target range to an external device. Here, the output unit 106 may output the information on the monitoring target range to any external device such as the imaging device 20, a printer, or an external server. In a case where the information processing device 10 executes monitoring processing, the output unit 106 does not need to output the information on the monitoring target range to the external device.

In the first embodiment, an example in which the information processing device 10 and the imaging device 20 exist separately has been described. However, the information processing device 10 may include an imaging unit corresponding to the imaging device 20. Alternatively, the imaging device 20 may include the functional units of the information processing device 10.

[Effect]

As described in the first embodiment above, the user only designates a line to be able to determine the monitoring target range. Thus, easy determination of the monitoring target range can be achieved. In addition, since the range indicated by the area on the line having the increased thickness is determined as the monitoring target range, a range indicated by an area away from the line is not set as the monitoring target. Thus, an appropriate range can be determined as the monitoring target. Therefore, it is possible to reduce the possibility of erroneously detecting movement of a person or object within a range where no person or object is likely to move, when monitoring the predetermined place.

Second Embodiment

In the first embodiment, the thickness of the line designated by the user is increased by the predetermined length to determine the monitoring target range. However, in a second embodiment, thicknesses of the line are increased until the line reaches (extends to) a boundary location in the image data. This allows for determining the monitoring target range more appropriately than in the first embodiment.

A configuration of an information processing system 1 according to the second embodiment is similar to the configuration according to the first embodiment, and thus is not described in detail. Note that the monitoring range determination processing of the flowchart illustrated in FIG. 4 differs only in step S1004. Thus, only step S1004 will be described in detail below.

Figure 5B:
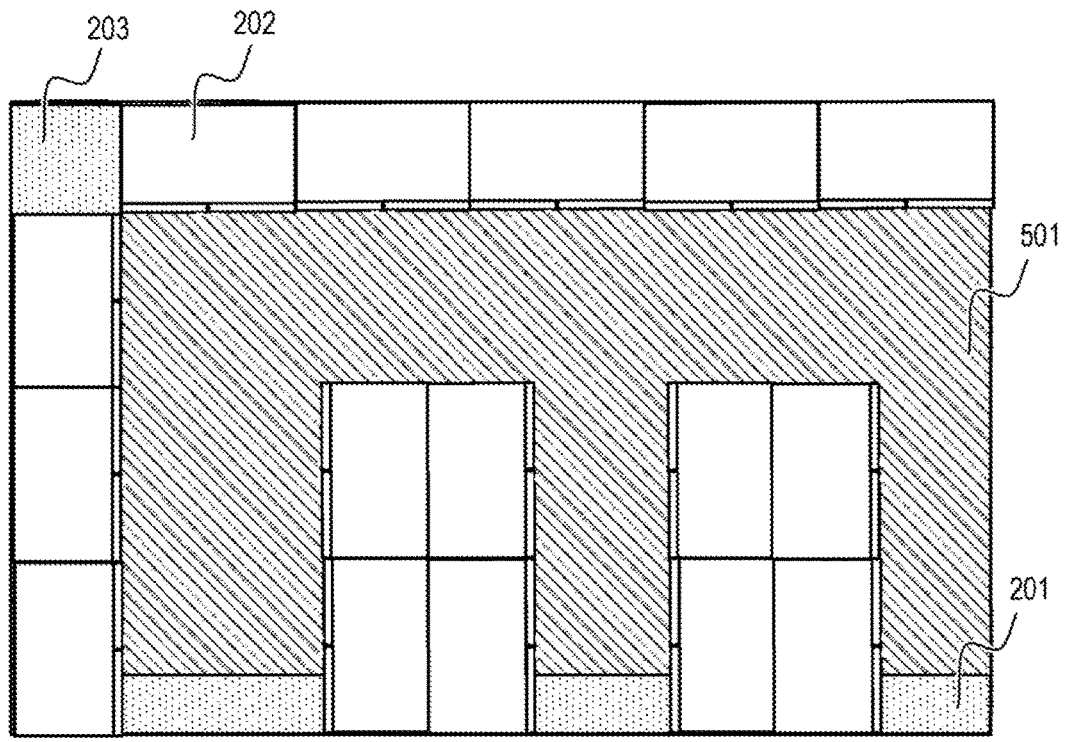
FIG. 5B is a diagram illustrating an area corresponding to a monitoring target range according to a second embodiment.

In step S1004, the area determination unit 104 determines the monitoring target range on the basis of the image data and the line information. In the second embodiment, the area determination unit 104 increases thicknesses of the line designated by the user until positions on the line reach a boundary location in the image data. Here, the boundary location is a boundary between areas, a boundary between objects, or the like. For example, when the line 301 is designated along the aisle 201 in the office as illustrated in FIG. 3A, the area determination unit 104 increases a thickness of the line 301 at each point of the line 301 in the normal direction until the line 301 reaches a boundary between the aisle 201 and the shelves 202. That is, as illustrated in FIG. 5B, the area determination unit 104 determines a range indicated by an area 501 on the line 301 having the increased thicknesses as the monitoring target range. Thus, unlike the first embodiment, in the second embodiment, the thickness in the normal direction may be different at each point of the line designated by the user.

Here, any method can be applied as a method of determining the boundary location. For example, the area determination unit 104 can determine the boundary location according to an edge in the image data, a difference in color (pixel value) in the image data, height information included in the image data, and the like. Here, the height information is information indicating a position in a direction perpendicular to a direction in which an area spreads in the image data, and is usually vertical position information.

In a case of using an edge in the image data to determine the boundary location, the area determination unit 104 first extracts edge information from the image data. Then, the area determination unit 104 sets edge pixels as the boundary location, increases the thicknesses of the line designated by the user until the positions on the line reach the edge pixels, and determines the range indicated by the area on the line having the increased thicknesses as the monitoring target range.

In a case of using color in the image data to determine the boundary location, the area determination unit 104 first acquires a pixel value as color information of each pixel of the image data. Then, the area determination unit 104 increases the thicknesses of the line designated by the user until the line reaches locations whose pixel values differ from pixel values of pixels of the points of (positions on) the line (pixels in the image data indicated by the points of the line) by more than a first threshold. For example, assume that the first threshold is 20 and the pixel value of a pixel at a certain point of the line is 100. Then, the area determination unit 104 increases the thickness of the line at the point in the normal direction to a pixel whose pixel value is larger than the pixel value of 120 or smaller than the pixel value of 80. The area determination unit 104 performs this process on each point of the line designated by the user, and determines the range indicated by the area on the line having the increased thicknesses as the monitoring target range.

In a case of using height information included in the image data to determine the boundary location, the area determination unit 104 first acquires the height information of each pixel of the image data from the image data. Note that the imaging device 20 may include a sensor that acquires the height information along with the image data, and add the height information to the image data to transmit the height information and the image data to the information processing device 10. At this time, a technique such as time of flight (TOF) or light detection and ranging (LIDAR) can be applied to the sensor. Then, the area determination unit 104 increases the thicknesses of the line designated by the user until the line reaches locations where heights differ from heights at locations of the points of the line (height at positions in the image data indicated by the points of the line) by more than a second threshold. For example, assume that the second threshold is 30 and the height at a location of a certain point of the line is 200. Then, the area determination unit 104 increases the thickness of the line at the point in the normal direction to a location where the height is larger than the height of 230 or smaller than the height of 170. The area determination unit 104 performs this process on each point of the line designated by the user, and determines the range indicated by the area on the line having the increased thicknesses as the monitoring target range.

[Effect]

As in the second embodiment, setting the range indicated by the area on the line having the thicknesses increased until the line reaches the boundary location such as a boundary between two areas as the monitoring target range allows for more clearly determining the range where a person or object is likely to move. Therefore, it is possible to determine a more appropriate monitoring target than in the first embodiment, and to easily determine the monitoring target range.

<First Modification>

Figure 8A:
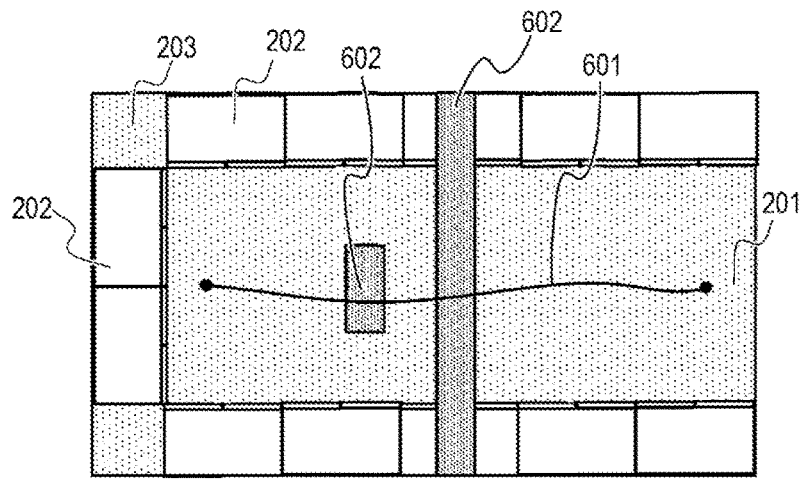
FIG. 8A is a diagram illustrating a line designated by a user according to a first modification.
Figure 8B:
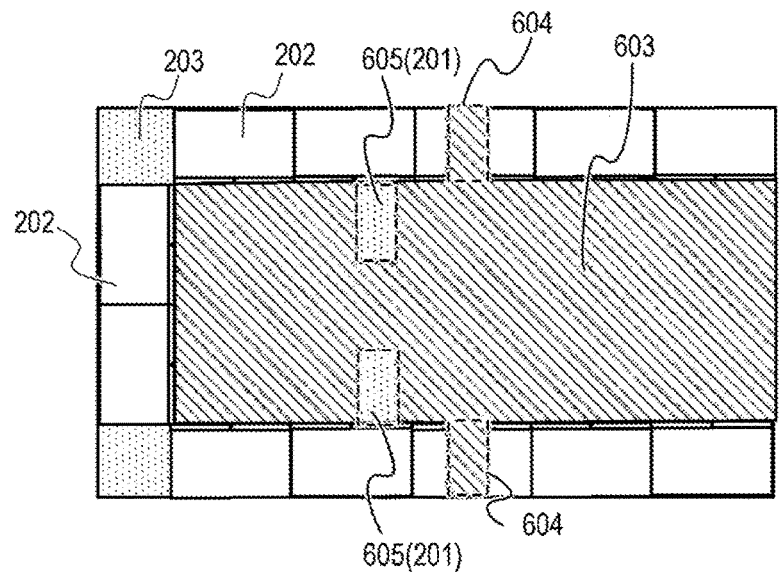
FIG. 8B is a diagram illustrating an area corresponding to a monitoring target range in a case where the line illustrated in FIG. 8A has a thickness increased by a method according to the second embodiment.

Hereinafter, an example in which a range closer to what the user expects can be determined as the monitoring target range than in the second embodiment will be described as a first modification. Here, as illustrated in FIG. 8A, it is assumed that an installation object 602 such as a signboard or an illumination is installed above the aisle 201 (a position higher than the aisle 201), and a line 601 is designated so as to straddle the installation object 602. In such a case, in the second embodiment, a range indicated by an area 603 is determined as the monitoring target range as illustrated in FIG. 8B. However, a range indicated by an area 604 included in the area 603 is originally expected not to be set as the monitoring target because the installation object 602 is thought to be installed above the shelves 202. Similarly, a range indicated by an area 605 not included in the area 603 is originally expected to be set as the monitoring target because the range is included in the aisle 201. That is, in the second embodiment, an inappropriate range may be determined as the monitoring target range. On the other hand, in the first modification, line thicknesses are increased until the line extends to the boundary location as in the second embodiment. Then, an information processing system unifies an increased amount of a thickness of the entire line on the basis of a result of increasing the line thicknesses. This allows for more appropriate determination of the monitoring target range.

A configuration of an information processing system 1 according to the first modification is similar to the configuration according to the first embodiment, and thus is not described in detail. Note that the monitoring range determination processing of the flowchart illustrated in FIG. 4 differs only in step S1004. Thus, only step S1004 will be described in detail below.

In step S1004, the area determination unit 104 calculates thicknesses of the line designated by the user at points of the line in the normal direction in a case where the thicknesses of the line at the points of the line are increased until the line reaches a boundary location as in the second embodiment. Then, the area determination unit 104 calculates an average value of the thicknesses calculated at the points of the line in the normal direction, and determines a range indicated by an area on the line having a thickness increased by the average value at the points of the line as the monitoring target range. That is, in the first modification, the predetermined length for increasing the line thickness according to the first embodiment is determined by the average value. Note that not only the average value but also, for example, a representative value such as a minimum value, a maximum value, a median value, or a mode value is applicable. For example, using the maximum value results in determining a wide range as the monitoring target range, and thus is effective in a case of highly accurate monitoring (such as monitoring for thorough inspection of components). This allows for reducing the possibility of failure to monitor movement of a person or object. Using the minimum value results in determining a narrow range as the monitoring target range, and thus is effective in a case of minimum monitoring (such as monitoring whether or not a person passes through for illumination lighting). This allows for suppressing the usage of the CPU and the memory during the monitoring.

It is not necessary to use the average value of the thicknesses calculated at all the points of the line designated by the user. For example, a plurality of points may be randomly determined, and an average value of the thicknesses calculated at the plurality of points may be used. Furthermore, a point may be extracted at every predetermined distance on the line designated by the user, and an average value of the thicknesses calculated at the extracted plurality of points may be used. Alternatively, the plurality of points may correspond to pixels (pixels in the image data) having a pixel value on the line designated by the user, a difference between the pixel value and a set pixel value being smaller than a predetermined threshold. Then, an average value of the thicknesses calculated at the plurality of points may be used. Note that the set pixel value may be a value arbitrarily set (determined) by the user, or may be a pixel value of most pixels (pixels in the image data) corresponding to the points of the line designated by the user.

The area determination unit 104 does not need to determine one representative value for the line designated by the user. That is, the area determination unit 104 may determine the representative value by the above method for each of a plurality of second lines obtained by dividing the line designated by the user, and increase thicknesses of the second lines by a length of the representative value for each of the plurality of second lines. Then, the area determination unit 104 may determine a range indicated by an area on the plurality of second lines having the increased thicknesses as the monitoring target range. This allows the line to have the thicknesses corresponding to places in a case where a width of the aisle 201 varies from place to place, for example, like the case where the user designates the line 301 as illustrated in FIG. 3A. Thus, the monitoring target range can be determined with higher accurately.

[Effect]

Figure 8C:
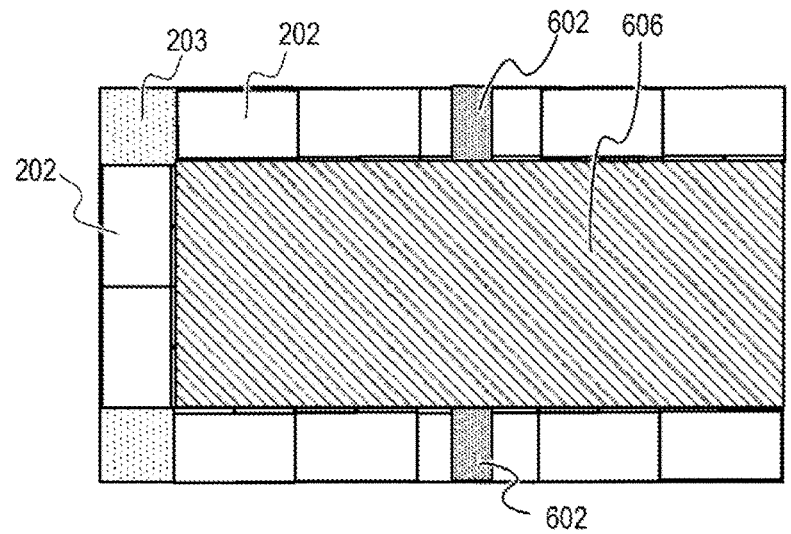
FIG. 8C is a diagram illustrating an area corresponding to a monitoring target range in a case where the line illustrated in FIG. 8A has a thickness increased by a method according to the first modification.

According to the first modification, the thickness of the line designated by the user is unified as a whole on the basis of the result of increasing the thicknesses of the line until the line reaches the boundary location. Therefore, it is possible to reduce the possibility of local increase or decrease in the line thickness that is originally not expected. That is, a range closer to what user expects can be determined as the monitoring target range. For example, even when the line 601 is designated so as to straddle the installation object 602 as illustrated in FIG. 8A, an area 606 indicating a range in which the aisle 201 can be assumed to exist can be appropriately determined as illustrated in FIG. 8C. Thus, the monitoring target range can be determined with higher accuracy.

According to the first modification, it can also be said that the predetermined length for increasing the line thickness according to the first embodiment is determined on the basis of the boundary location that is a boundary between two areas or objects according to the second embodiment. Therefore, the predetermined length can be determined without a user input. Furthermore, for example, the predetermined length that is previously determined can be used to determine the monitoring target range again when an arrangement of the office changes. Therefore, according to the first modification, another determination of the monitoring target range can be realized with a smaller number of processes than in the second embodiment.

Note that the above embodiments and modification can be implemented in any combination. Moreover, the image data acquired by the information processing device 10 is not limited to image data acquired from the imaging device 20, and may be image data acquired from an external server. Thus, the imaging device 20 is not a key component in the information processing system 1. Furthermore, in the above description, the normal direction is used as a direction in which the thickness of the line designated by the user is increased. However, the thickness of the line may be increased in a direction that can be regarded as substantially the same as the normal direction (for example, a direction shifted by 5 degrees from the normal direction).

Supplementary Note 1

An information processing device (10) that determines a monitoring target range of a predetermined place, the information processing device (10) including:
  an acquisition unit (103) configured to acquire information on a line drawn by a user with respect to image data in which the predetermined place is imaged; and
  a determination unit (104) configured to determine a range indicated by an area on the line as the monitoring target range, a thickness of the line being increased.

Supplementary Note 2

A range determination method of determining a monitoring target range of a predetermined place, the range determination method including steps of:
  acquiring information on a line drawn by a user with respect to image data in which the predetermined place is imaged (S1003); and
  determining a range indicated by an area on the line as the monitoring target range, a thickness of the line being increased (S1004).

DESCRIPTION OF SYMBOLS

1 information processing system
10 information processing device
20 imaging device
101 image acquisition unit
102 image display unit
103 user input accepting unit 104 area determination unit
105 storage unit
106 output unit

The invention claimed is:

1. An information processing device that determines a monitoring target range of a predetermined place, the information processing device comprising:
   (i) a memory configured to store computer-executable instructions and a processor configured to execute the computer-executable instructions stored in the memory, (ii) an integrated circuit, or both (i) and (ii) that cause the information processing device to:
   acquire information on a line drawn by a user with respect to image data in which the predetermined place is imaged; and
   determine a range indicated by an area on the line as the monitoring target range, a thickness of the line being increased, wherein
   the range indicated by the area on the line is determined as the monitoring target range by increasing thicknesses of the line at locations of points of the line until the line reaches a boundary location included in the image data.

2. An information processing device that determines a monitoring target range of a predetermined place, the information processing device comprising:
   (i) a memory configured to store computer-executable instructions and a processor configured to execute the computer-executable instructions stored in the memory, (ii) an integrated circuit, or both (i) and (ii) that cause the information processing device to:
   acquire information on a line drawn by a user with respect to image data in which the predetermined place is imaged; and
   determine a range indicated by an area on the line as the monitoring target range, a thickness of the line being increased, wherein
   (i) the memory configured to store computer-executable instructions and the processor configured to execute the computer-executable instructions stored in the memory, (ii) the integrated circuit, or both (i) and (ii) cause the information processing device to:
   calculate thicknesses of the line at locations of points of the line in a case where the thicknesses of the line at the locations of the points of the line are increased until the line reaches a boundary location included in the image data; and
   determine a range indicated by an area on the line as the monitoring target range, a thickness of the line being increased by a length of a representative value of thicknesses calculated at locations of a plurality of points among the points of the line.

3. The information processing device according to claim 2, wherein
   the representative value is an average value.

4. The information processing device according to claim 2, wherein
   the plurality of points are points corresponding to pixels having a pixel value among the points of the line, a difference between the pixel value and a set pixel value being smaller than a predetermined threshold.

5. The information processing device according to claim 4, wherein
   the set pixel value is a pixel value that most pixels have among pixels corresponding to the points of the line.

6. The information processing device according to claim 2, wherein
   (i) the memory configured to store computer-executable instructions and the processor configured to execute the computer-executable instructions stored in the memory, (ii) the integrated circuit, or both (i) and (ii) cause the information processing device to determine the representative value for each of a plurality of second lines obtained by dividing the line, and determine a range indicated by an area on the plurality of second lines as the monitoring target range, thicknesses of the plurality of second lines being increased by a length of the representative value for each of the plurality of second lines.

7. The information processing device according to claim 1, wherein
   the boundary location is a location of an edge pixel in the image data.

8. The information processing device according to claim 1, wherein
   the boundary location is a location of a pixel in the image data, a pixel value of the pixel differing from a pixel value of pixels at the locations of the points of the line by more than a first threshold.

9. The information processing device according to claim 1, wherein
   the image data comprises height information of positions of the predetermined place, and
   the boundary location is a location in the image data, a height at the location differing from a height at the locations of the points of the line by more than a second threshold.

10. The information processing device according to claim 1, further comprising:
    a display configured to display an image based on the image data, wherein
    (i) the memory configured to store computer-executable instructions and the processor configured to execute the computer-executable instructions stored in the memory, (ii) the integrated circuit, or both (i) and (ii) cause the information processing device to accept a user input for drawing the line with respect to the image data.

11. The information processing device according to claim 1, further comprising:
    an image capturing device configured to acquire the image data by imaging.

12. A range determination method of determining a monitoring target range of a predetermined place, the range determination method comprising steps of:
    acquiring information on a line drawn by a user with respect to image data in which the predetermined place is imaged; and
    determining a range indicated by an area on the line as the monitoring target range, a thickness of the line being increased, wherein
    the range indicated by the area on the line is determined as the monitoring target range by increasing thicknesses of the line at locations of points of the line until the line reaches a boundary location included in the image data.

13. A non-transitory computer readable medium storing a program for causing a computer to execute the steps of the range determination method according to claim 12.

* * * * *